(12) United States Patent
Spannagel et al.

(10) Patent No.: US 10,809,461 B2
(45) Date of Patent: Oct. 20, 2020

(54) PHOTONIC INPUT/OUTPUT COUPLER ALIGNMENT

(71) Applicant: Juniper Networks, Inc., Sunnyvale, CA (US)

(72) Inventors: Martin A. Spannagel, San Francisco, CA (US); Brian Robert Koch, Brisbane, CA (US); Jared Bauters, Santa Barbara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/589,399

(22) Filed: Oct. 1, 2019

(65) Prior Publication Data
US 2020/0033538 A1 Jan. 30, 2020

Related U.S. Application Data

(63) Continuation of application No. 15/967,313, filed on Apr. 30, 2018, now Pat. No. 10,527,796.

(51) Int. Cl.
*G02B 6/30* (2006.01)
*G02B 6/12* (2006.01)
(Continued)

(52) U.S. Cl.
CPC ........... *G02B 6/30* (2013.01); *G02B 6/12004* (2013.01); *G02B 6/42* (2013.01); *G02B 6/4214* (2013.01);
(Continued)

(58) Field of Classification Search
CPC ........ G02B 6/122; G02B 6/124; G02B 6/125; G02B 6/30; G02B 6/305; G02B 6/34;
(Continued)

(56) References Cited

U.S. PATENT DOCUMENTS 7,298,939 B1   11/2007   Malendevich et al.
9,335,480 B1   5/2016   Celo
(Continued)

FOREIGN PATENT DOCUMENTS

CN   103430064   12/2013
CN   106461889   2/2017
(Continued)

OTHER PUBLICATIONS

US 10,466,420 B1, 11/2019, Spannagel et al. (withdrawn)
(Continued)

*Primary Examiner* — Michael P Mooney
(74) *Attorney, Agent, or Firm* — Schwegman Lundberg & Woessner, P.A.

(57) ABSTRACT

Optical alignment of an optical connector to input/output couplers of a photonic integrated circuit can be achieved by first actively aligning the optical connector successively to two loopback alignment features formed in the photonic chip of the PIC, optically unconnected to the PIC, and then moving the optical connector, based on precise knowledge of the positions of the loopback alignment features relative to the input/output couplers of the PIC, to a position aligned with the input/output couplers of the PIC and locking it in place.

20 Claims, 11 Drawing Sheets

(51) Int. Cl.
    *G02B 6/42*         (2006.01)
    *G02B 6/43*         (2006.01)

(52) U.S. Cl.
    CPC ......... *G02B 6/4219* (2013.01); *G02B 6/4225* (2013.01); *G02B 6/4227* (2013.01); *G02B 6/4228* (2013.01); *G02B 6/43* (2013.01)

(58) Field of Classification Search
    CPC ............ G02B 6/12004; G02B 6/29344; G02B 6/3656; G02B 6/42; G02B 6/4214; G02B 6/4219; G02B 6/422; G02B 6/4225; G02B 6/4227; G02B 6/4228; G02B 6/43
    USPC ................ 385/14, 31, 37, 39, 49–52, 88–92
    See application file for complete search history.

(56) References Cited

U.S. PATENT DOCUMENTS

| | | | |
|---|---|---|---|
| 10,527,796 B2 | 1/2020 | Spannagel et al. | |
| 2018/0062748 A1* | 3/2018 | Mack | H01L 21/681 |
| 2019/0331859 A1 | 10/2019 | Spannagel et al. | |

FOREIGN PATENT DOCUMENTS

| | | |
|---|---|---|
| CN | 106796324 | 5/2017 |
| CN | 107065082 | 8/2017 |
| CN | 110412692 | 11/2019 |
| SG | 10201902045X | 11/2019 |
| TW | 202001314 | 1/2020 |
| WO | 2016180067 | 11/2016 |
| WO | 2017005168 | 1/2017 |

OTHER PUBLICATIONS

"U.S. Appl. No. 15/967,313, Notice of Allowance dated Aug. 28, 2019".

U.S. Appl. No. 15/967,313, filed Apr. 30, 2018, Photonic Input/Output Coupler Alignment.

"European Application Serial No. 19165889.7, Extended European Search Report dated Sep. 24, 2019", 8 pgs.

"U.S. Appl. No. 15/967,313, Corrected Notice of Allowability dated Nov. 29, 2019", 7 pgs.

Attila, Mekis, "Monolithic integration of photonic and electronic circuits in a CMOS process", Visual Communications and Image Processing; San Jose, vol. 6897, (Feb. 12, 2008), 14 pgs.

"Chinese Application Serial No. 201910243516.1, Office Action dated Mar. 30, 2020", w English Translation, 16 pgs.

"Chinese Application Serial No. 201910243516.1, Office Action dated Sep. 4, 2020", w/ English Translation, 4 pgs.

"Chinese Application Serial No. 201910243516.1, Response filed Aug. 14, 2020 to Office Action dated Mar. 30, 2020", w/ English Claims, 16 pgs.

* cited by examiner

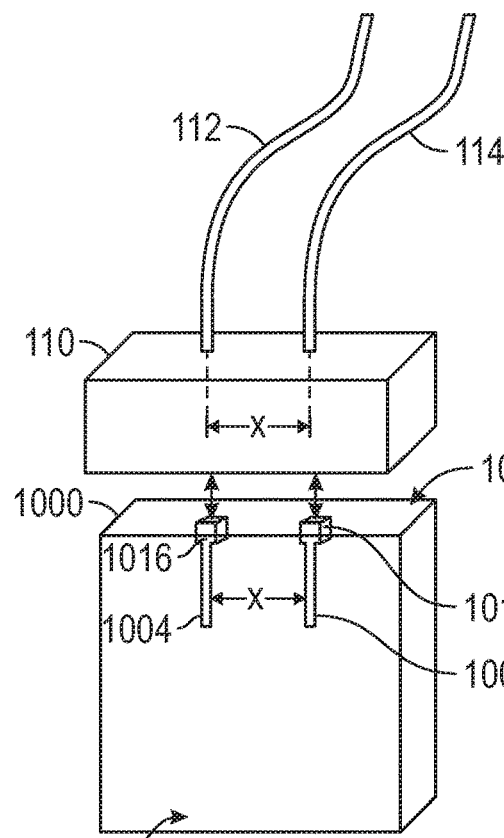
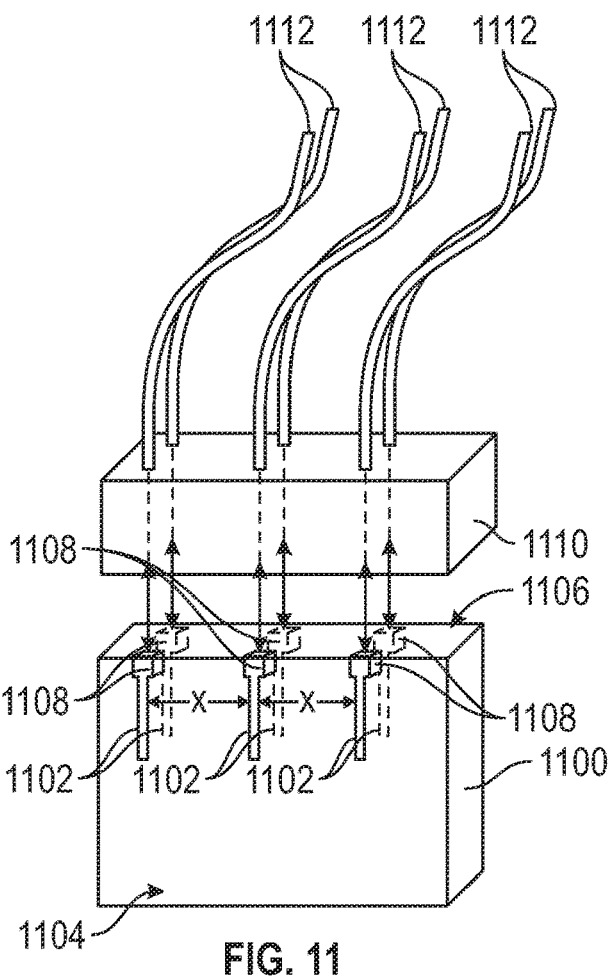
FIG. 10
FIG. 11
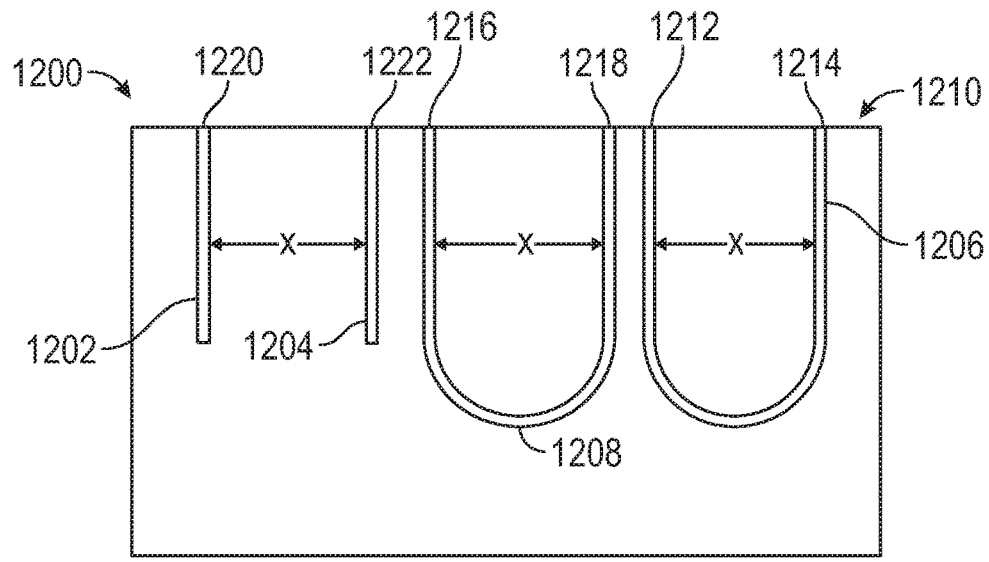
FIG. 12

US 10,809,461 B2

PHOTONIC INPUT/OUTPUT COUPLER ALIGNMENT

PRIORITY

This application is a continuation of U.S. patent application Ser. No. 15/967,313, filed Apr. 30, 2018, which has been incorporated by reference herein in its entirety.

TECHNICAL FIELD

This disclosure relates to aligning optical connectors with input/output couplers of a photonic integrated circuit.

BACKGROUND

Photonic integrated circuits (PICs), as are commonly used, for example, in optical routers and switches, generally include input/output couplers for optically connecting the PICs to optical fibers or other off-chip optical connectors. For example, planar waveguides in a PIC may end in grating couplers that can surface-couple light (via the top surface of the photonic chip) into out-of-plane optical fibers. Alternatively, the waveguides may be edge-coupled to fibers at side faces of the photonic chip. To ensure efficient coupling of light between the optical connector (such as an optical fiber or fiber ribbon) and the PIC, the communication channel(s) of the optical connector (e.g., the individual fibers of a fiber ribbon) need to be precisely aligned with the input/output coupler(s) of the PIC. For multi-mode optical signals, where alignment accuracies within 2 µm are sufficient, alignment can be achieved visually based, for instance, on fiducial markers placed on the photonic chip at accurately known positions relative to the input/output couplers. Efficient single-mode coupling, however, relies on accuracies within 1 µm or less, which exceeds the performance of visual alignment. Therefore, single-mode fibers or other optical connectors are usually aligned to the PIC actively.

During active alignment, light may be coupled from the optical connector into an input coupler of the PIC and measured by a detector of the PIC, or, alternatively, light generated by an on-chip light source may be coupled from an output coupler of the PIC into the optical connector and measured by an off-chip detector. Either way, by maximizing the intensity of the detected signal as the optical connector is wiggled about the approximate location of the input/output coupler of the PIC, the alignment can be optimized. Active alignment is, however, time-consuming because it involves powering up the PIC (to enable use of the on-chip light source or detector), which entails time to establish the requisite electrical connections and time waiting for the PIC to reach thermal and optical stability. Accordingly, an alternative method for single-mode alignment is desirable.

BRIEF DESCRIPTION OF THE DRAWINGS

Various example embodiments are herein described in conjunction with the accompanying drawings.

FIG. 10 is a perspective view of an optical connector in position for optical coupling to a pair of waveguide edge couplers, in accordance with various embodiments.

FIG. 11 is a perspective view of an optical connector in position for optical coupling to an array of six waveguide edge couplers, in accordance with various embodiments.

FIG. 12 is a schematic top view of a photonic chip including a pair of waveguide edge couplers of a PIC and two associated loopback alignment features, in accordance with various embodiments.

DETAILED DESCRIPTION

Figure 1A:
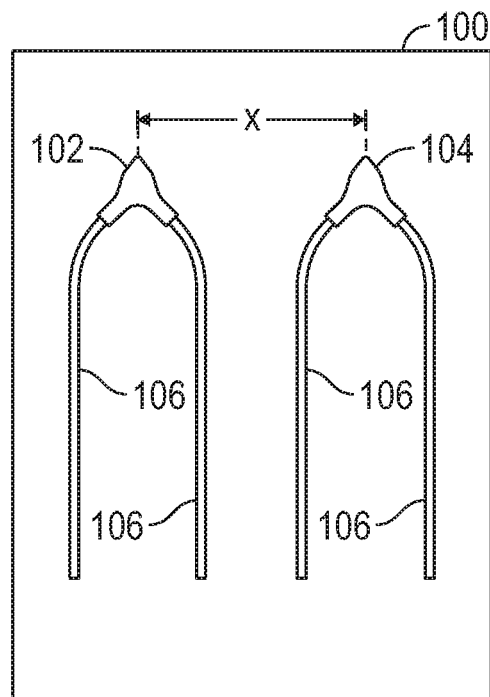
FIG. 1A is a schematic top view of a pair of grating couplers of a PIC, in accordance with various embodiments.

Disclosed herein is an approach for aligning optical connectors to input/output couplers of a PIC formed in a photonic chip that uses loopback alignment features formed in the photonic chip optically unconnected to the PIC. A "PIC" is herein understood as a set of optical (and/or electro-optic) components integrated in the photonic chip that are all optically coupled to each other so as to form a single optical circuit. By contrast, the term "photonic chip" is herein used in reference to the physical unit formed by the photonic-chip substrate (e.g., a die cut from a silicon, silicon-on-insulator (SOI), III-V or II-IV or compound, or other wafer, optionally with additional material layers deposited thereon) and any components formed in or on the substrate, including, but not limited to, the components of the PIC. A loopback alignment feature as described herein is formed in the same photonic chip as the PIC whose alignment it serves, but is not itself part of that PIC; rather, the loopback alignment feature forms a separate component that is not optically connected to the PIC.

An optical connector as used herein generally includes at least two optical communication channels for coupling to at least two respective input/output couplers of the PIC. The end points of the individual communication channels of the optical connector generally have fixed relative distances and positions, matching the fixed relative distances and positions of the coupling points on the input/output couplers of the PIC to which the optical connector is designed to couple. In various embodiments, the end points of the communication channels of the optical connector and the coupling points of the input/output couplers of the PIC are arranged in arrays. The optical connector may take the form of two or more optical fibers, which may be packaged, for example, in a fiber ribbon. Other possible embodiments of an optical connector include a fiber-coupling lens array, a lens matrix, an array of silicon waveguides, another PIC, etc. The input/output couplers of the PIC may be implemented, for instance, as grating couplers, turning mirrors, or other surface couplers that re-direct light from a waveguide in the plane of the PIC through the top surface of the photonic chip into an out-of-plane fiber or other communication channel of the optical connector, or as waveguide edge couplers that couple light through a side face of the photonic chip into an optical communication channel of the optical connector in-plane with the PIC.

In general, a loopback alignment feature in accordance herewith is formed by a pair of input/output couplers that are optically connected in the chip, e.g., via a waveguide. Such a loopback alignment feature can be actively aligned with an optical connector having at least two communication channels (e.g., two optical fibers): light from a light source external to the photonic chip can be coupled, via one of the channels, into one of the couplers (acting as input coupler) of the loopback alignment feature, and after the light has traversed the "loop back" to the other coupler (acting as output coupler) of the loopback alignment feature, the light can be coupled from the output coupler into another one of the optical-connector channels to be measured by a detector external to the photonic chip. Once the optical connector has been actively aligned to the loopback alignment feature, it can be simply moved into alignment with the input/output couplers of the PIC based on knowledge of the position of the loopback alignment feature relative to the input/output couplers of the PIC. Precise knowledge of that relative position may be available, for instance, as a result of the photolithographic definition of the loopback alignment feature on the photonic chip simultaneously with the definition of the input/output couplers of the PIC, e.g., using a single photomask. The optical connector, once aligned with the input/output couplers, can be locked in place such that its communication channels are securely coupled to the input/output couplers of the PIC.

In various embodiments, the alignment process utilizes two loopback alignment features to facilitate calibrating the coordinate system in which the PIC and loopback alignment features are defined relative to the movement of the optical connector. The optical connector is sequentially aligned to first one and then the other loopback alignment feature, and the direction in which the optical connector is moved from one to the other loopback alignment feature is used to determine the orientation of the coordinate system. The two loopback alignment features may form separate structures in the PIC, or may, alternatively, jointly form a single structure.

Beneficially, by using loopback alignment features as described herein to align an optical connector with, ultimately, the input/output couplers of a PIC, alignment accuracies suitable for single-mode coupling can be achieved without the need to power up the PIC. As a result, the throughput of photonic chips at the alignment stage of a manufacturing line can be increased substantially, for example, fourfold in some embodiments. Further reducing cost, the equipment used for (usually automatic) alignment can be greatly simplified, as electronics for powering up the device and tooling to establish electrical connections are no longer needed. In addition, the alignment process described herein can be performed across a range of temperatures, allowing to compensate for thermal expansion, and variations in the process resulting from optical device variations between channels can be eliminated. For example, if the PIC is intended to operate between 0 and 100° C., the alignment may be done at 50° C. in order to minimize the error from thermal expansion/contraction mismatch between the PIC and the connector across the range of 0 to 100° C.

Various example embodiments will now be described with reference to the accompanying drawings.

Figure 1B:
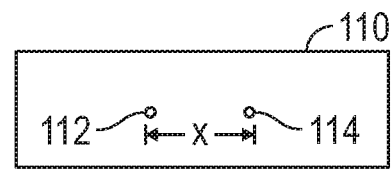
FIG. 1B is a schematic bottom view of an optical connector with two communication channels matching the pair of grating couplers in width, in accordance with various embodiments.
Figure 1C:
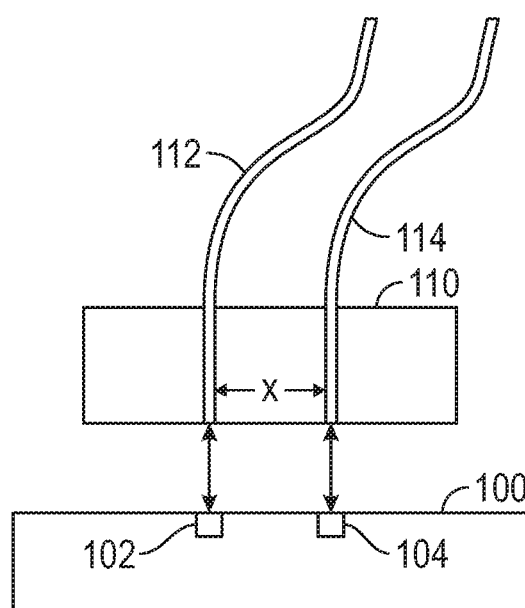
FIG. 1C is a schematic side view of the optical connector of FIG. 1B in position for optical coupling to the pair of grating couplers of FIG. 1A, in accordance with various embodiments.

FIGS. 1A-1C illustrated the coupling of an example optical connector with two communication channels to two grating couplers of a PIC in an example photonic chip. The two grating couplers may be both input couplers or both output couplers, or include both an input coupler and an output coupler. FIG. 1A provides a schematic top view of the example photonic chip 100, showing the two grating couplers 102, 104 connected to associated waveguides 106 of the PIC. For simplicity and clarity, no other components of the PIC are shown. Note, however, that, although not shown, the grating couplers 102, 104 are generally optically connected via a path through the PIC. (It is noted that the photonic chip 100 may, in some embodiments, include multiple PICs with multiple respective sets of grating couplers; in this case, there need not be optical connections between grating couplers of different ones of the PICS.) The distance between the two grating couplers—or, more precisely, the distance between their respective coupling points, herein taken to be the geometric centers of the grating couplers 102, 104—has a value specified by design (e.g., in the photomask used to create the grating couplers 102, 104 on the photonic chip), indicated as distance x in FIG. 1A. In the depicted example, each of the grating couplers 102, 104 is a polarization splitting coupler connected to a pair of waveguides 106. The waveguides 106 of each grating coupler 102 or 104 guide light of two respective orthogonal polarizations into which the grating coupler 102 or 104 separates light received from an optical connector when operating as an input coupler, or which it combines when operating as an output coupler. In alternative embodiments, single-polarization grating couplers each connected to only one waveguide of the PIC may be used. The grating couplers 102, 104 may be formed by gratings including a plurality of elongate scattering elements. The grating couplers 102, 104 may be flared, optionally with hyperbolically shaped sidewalls. The elongated scattering elements may have curved (e.g., in some embodiments, elliptical) shapes, and the grating widths may be selected to accommodate a desired optical intensity distribution.

FIG. 1B is a schematic bottom view of the example optical connector 110 with two communication channels 112, 114, which may be, for instances, optical fibers (as shown in FIG. 1C). The distance between the end points of the communication channels 112, 114 is x, matching the distance between the pair of grating couplers 102, 104 of the PIC. FIG. 1C illustrates, in a schematic side view of the optical connector 110 and the photonic chip 100, the lateral alignment of the communication channels 112, 114 of the optical connector 110 with the input/output couplers 102, 104 on the photonic chip 100 just prior to coupling.

Figure 2:
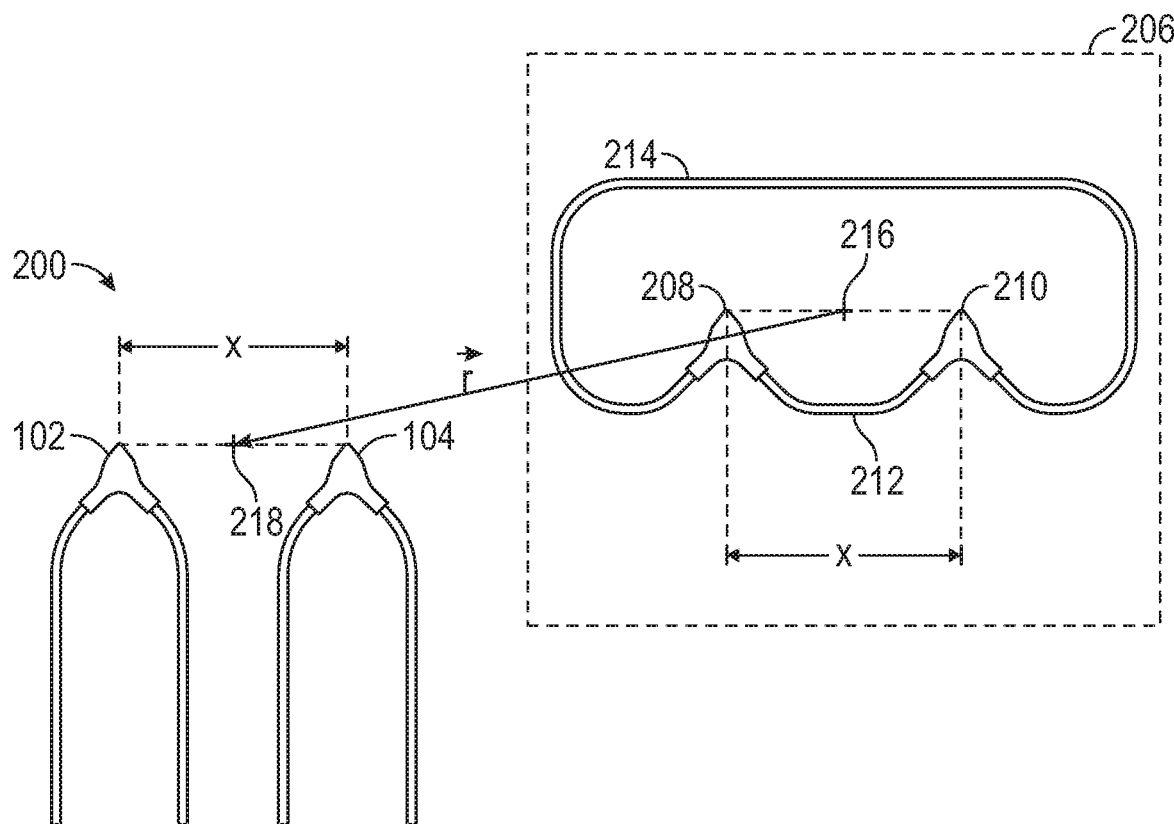
FIG. 2 is a schematic top view of a photonic chip including a pair of grating couplers of a PIC and an associated loopback alignment feature, in accordance with various embodiments.

Turning now to FIG. 2, the layout of an example photonic chip 200 including a pair of grating couplers 102, 104 of a PIC and an associated loopback alignment feature 206, as used, in accordance with various embodiments, to facilitate the alignment illustrated in FIG. 1C, is shown in a schematic top view. The loopback alignment feature 206 includes two (polarization-splitting) grating couplers 208, 210 that are optically connected, via two waveguides 212, 214, into a closed loop. The distance between the coupling points of the grating couplers 208, 210 of the loopback alignment feature 206 is equal to the distance x between the coupling points of the input/output grating couplers 102, 104 of the PIC, and, accordingly, also equal to the distance between the two communication channels of an optical connector 110 designed to mate with the input/output grating couplers 102, 104 of the PIC. Further, in accordance herewith, the position of the loopback alignment feature 206 relative to the grating couplers 102, 104 of the PIC, as reflected in the vector $\vec{r}$ from the midpoint 216 between the grating couplers 208, 210 of the loopback alignment feature 206 to the midpoint 218 between the grating couplers 102, 104 of the PIC, is known accurately and precisely. During the alignment process, the optical connector 110 is first actively aligned to the loopback alignment feature 206 by optimizing the optical coupling of the communication channels 112, 114 of the optical connector 110 to the grating couplers 208, 210 of the loopback alignment feature 206. Following its alignment to the loopback alignment feature 206, the optical connector 110 is moved by the vector $\vec{r}$ into alignment with the grating couplers 102, 104 of the PIC.

Figure 3:
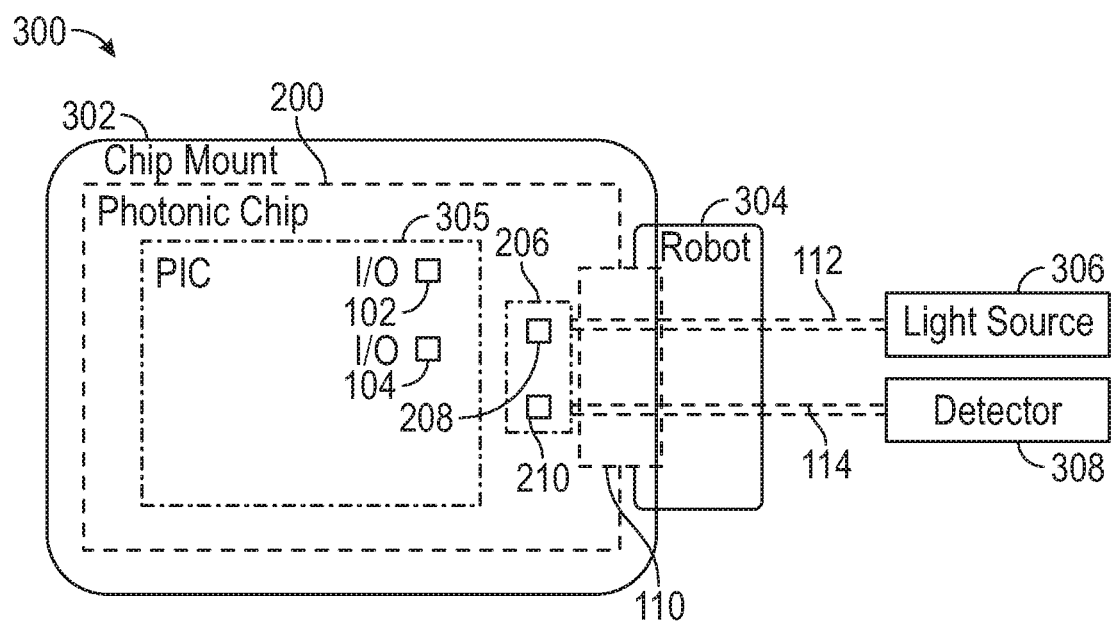
FIG. 3 is a conceptual diagram of an example alignment system using a loopback alignment feature in accordance with various embodiments.

FIG. 3 conceptually illustrates an example alignment system 300 that facilitates optical-connector alignment using a loopback alignment feature 206. The system 300 includes a mount 302 for securely retaining the photonic chip 200 and a robot 304 with high-accuracy stages (e.g., a three-axes or six-axes robot) for precisely translating and/or rotating the optical connector 110 relative to the photonic chip 200. Further, the system 300 includes a light source 306 and detector 308. Beneficially, the system 300 need not include electronics and tooling to establish electrical connections and supply electrical power to the devices of the PIC 305 on the photonic chip 200.

To actively align the optical connector 110 to the loopback alignment feature 206, one of the communication channels of the optical connector, say, channel 112, is used to provide an optical signal from the light source 306 as input to one of the grating couplers of the loopback alignment feature 206, say, coupler 208. From (input) coupler 208, the optical signal travels via the loopback waveguides 212, 214 (not shown in FIG. 3) to the other grating coupler 210, which serves as output coupler. Via the second communication channel 114 of the optical connector 110, the optical signal output at grating coupler 210 is delivered to the detector 308 for measurement. The measured signal can be provided as feedback to the robot 304 (e.g., via a controller controlling operation of the robot 304) to cause adjustments of the positioning of the optical connector 110 that optimize coupling between the communication channels 112, 114 and the grating couplers 208, 210 of the loopback alignment feature 206, thereby maximizing the signal. While, for purposes of this alignment process, one of the two connecting waveguides 212, 214 may suffice, establishing two optical connections as depicted in FIG. 2 is beneficial in that it enables retaining two polarizations of the light during the active alignment of an optical connector to the loopback alignment feature 206. With an unpolarized light source, half of the light would be lost with only one connection between the two grating couplers 208, 210, and with a polarized light source, there is a risk that all of the light may be lost (depending on the polarization state).

When the alignment to the loopback alignment feature 206 is complete, the robot 304 is then operated to move the optical connector 110 into a position aligned with the grating couplers 102, 104 of the PIC 305 on the photonic chip 200. Additional apparatus (not shown in FIG. 3) may aid in locking the optical connector 110 in place with epoxy, solder, laser weld, or by other means known to those of ordinary skill in the art.

Figure 4:
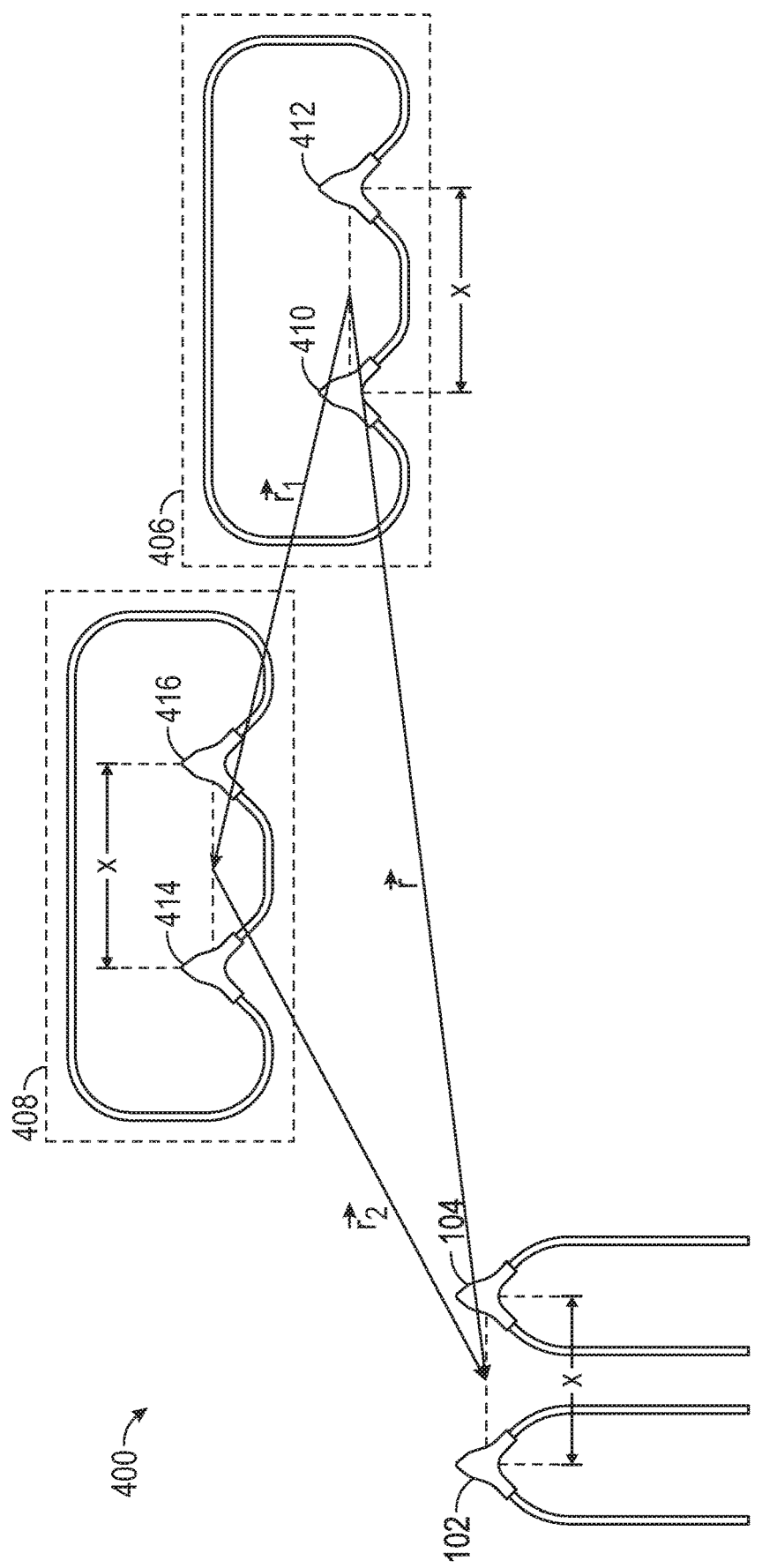
FIG. 4 is a schematic top view of a photonic chip including a pair of grating couplers of a PIC and two associated loopback alignment features, in accordance with various embodiments.

FIG. 4 shows the layout of an example photonic chip 400 including a pair of grating couplers 102, 104 of a PIC and two associated loopback alignment features 406, 408, in accordance with various embodiments. The two loopback alignment features 406, 408 may (but need not) be structurally similar or identical to each other (and to the loopback alignment feature 206 of the photonic chip 200 of FIG. 2). In particular, each of the loopback alignment features 406, 408 may have a pair of grating couplers (410, 412, and 414, 416) whose mutual distance is equal to the mutual distance x between the grating couplers 102, 104 of the PIC. The positions of the loopback alignment features 406, 408 are accurately known relative to each other and to the grating couplers 102, 104 of the PIC, and may be specified, for instance, by any two vectors among a vector $\vec{r}_1$ between the (midpoints between grating couplers 410, 412 and 414, 416 of the) loopback alignment features 406, 408, a vector $\vec{r}_2$ between the (midpoints between grating couplers 414, 416 of the) loopback alignment feature 408 and the pair of grating couplers 102, 104 of the PIC, and the vector $\vec{r}$ between the (midpoints between grating couplers 410, 412 of the) loopback alignment feature 406 and the pair of grating couplers 102, 104 of the PIC. The use of a second feedback alignment feature 408 may serve to calibrate the coordinate system in which the PIC and loopback alignment features 406, 408 are defined, in particular, to determine the orientation of that coordinate system relative to the coordinate system in which the movement of the optical connector 110 (by, e.g., the robot 304) is specified.

Figure 5A:
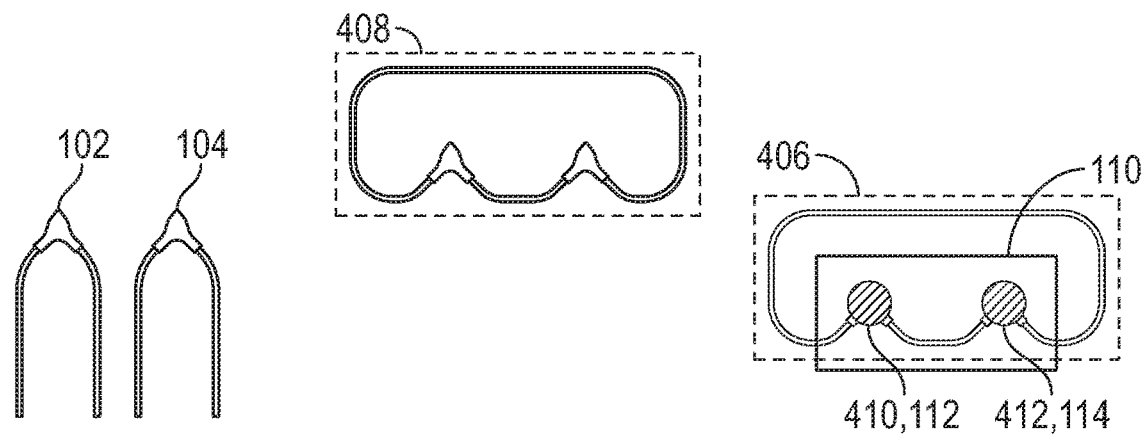
FIGS. 5A-5C are schematic top views of the photonic chip of FIG. 4 overlaid with an optical connector in various positions, illustrating the steps of aligning the optical connector with the pair of grating couplers in accordance with various embodiments.
Figure 5B:
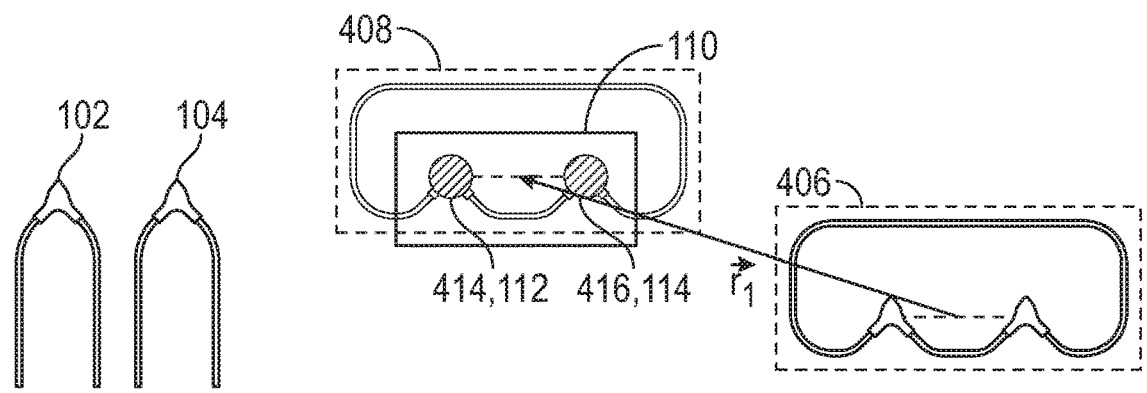
Figure 5C:
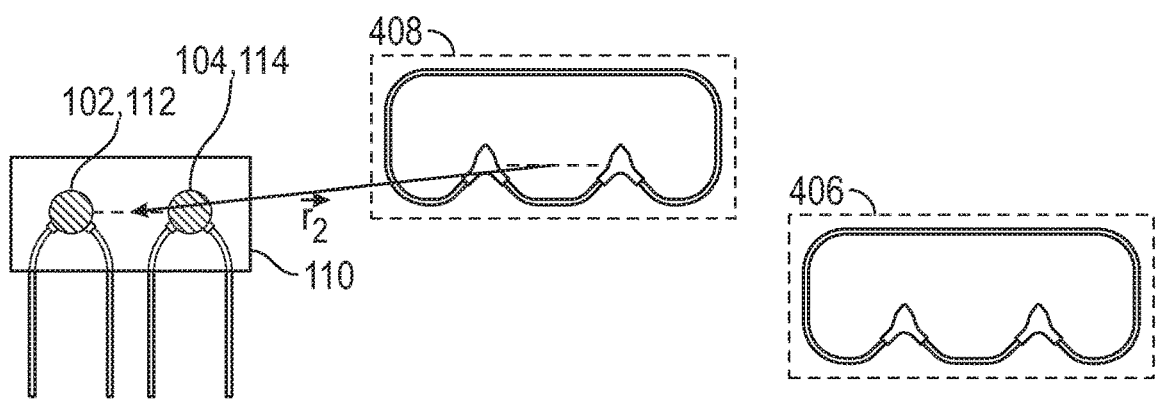

FIGS. 5A-5C are schematic top views of the photonic chip 400 of FIG. 4 overlaid with an optical connector 110 in various positions, illustrating the steps of aligning the optical connector 110 with the pair of grating couplers 102, 104 of a PIC in accordance with various embodiments. FIG. 5A depicts the two communication channels 112, 114 of the optical connector 110 aligned with the grating couplers 410, 412 of the first loopback alignment feature 406. FIG. 5B depicts the subsequent alignment of the two communication channels 112, 114 with the grating couplers 414, 416 of the second loopback alignment feature 408. The translation of the optical connector 110, by vector $\vec{r}_1$, from the first aligned state, shown in FIG. 5A, to the second aligned state, shown in FIG. 5B, determines the orientation of the photonic chip layout (and its associated coordinate system) within the coordinate system of the apparatus (e.g., robot 304) that moves the optical connector. Once the coordinate system associated with the chip layout has been thus calibrated, the optical connector can simply be moved by the known vector $\vec{r}_2$ from the second loopback alignment feature 408 to the grating couplers 102, 104 of the PIC, resulting in the final position of the optical connector 110 that is shown in FIG. 5C. In this final position, the optical connector 110 is secured in place.

In the absence of a second loopback alignment feature, the relative orientation between the coordinate system associated with the chip layout and the coordinate system associated with the movement of the robot 304 and optical connector 110, respectively, may, at least in principle, be inferable from the orientation of the optical connector 110 relative to the coordinate system in which it moves, e.g., as specified with a vector between the end points of the communication channels 112, 114 of the optical connector 110, When the optical connector 110 is aligned with the loopback alignment feature 206, the vector between these end points of the optical connector 110 coincides with the vector between the grating couplers of the loopback alignment feature 206, which, in turn, has a known direction and length within the chip layout. Thus, alignment of the optical connector 110 with the loopback alignment feature 206 may serve to calibrate the coordinate system in which the PIC and loopback alignment feature are defined. However, in practice, the orientation of the optical connector within, for instance, a grabber of the robot 304, is usually not be known with sufficient precision. This orientation can be approximated using a vision system to recognize alignment features on the PIC and the connector, but this is not necessarily precise. The use of two loopback alignment features is, in this case, beneficial to resolve the orientation uncertainty and avoid alignment errors. This is particularly important in cases where there are no repeatable, accurate features on the PIC's visible surface that the vision system can recognize, or if an accurate vision system is not available. For example, by using the two loopback alignment features for calibration of the PIC coordinate system with the robot's coordinate system, the accuracy of the vision system and the accuracy of the initial position and orientation of the robot relative to the PIC can be relaxed to tens of microns instead of needing to be smaller than about five microns.

Figure 6:
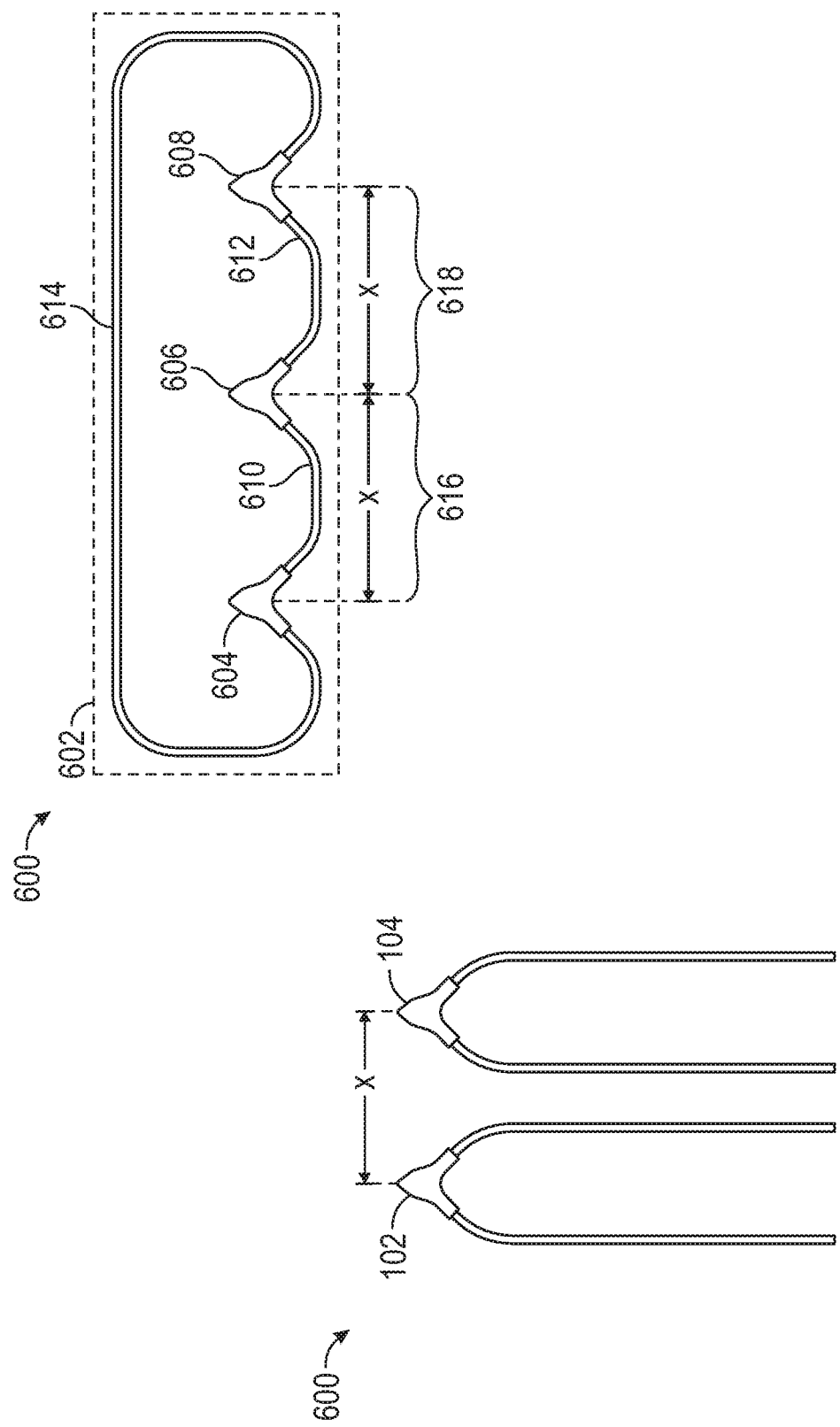
FIG. 6 is a schematic top view of a photonic chip including a pair of grating couplers of a PIC and an associated loopback structure with two loopback alignment features, in accordance with various embodiments.

As shown in FIG. 4, the two loopback alignment features may be implemented as separate, optically unconnected structures. As an alternative embodiment, FIG. 6 illustrates the layout of an example photonic chip 600 in which the two loopback alignment features are instead provided by a single loopback structure 602. This structure 602 includes, in the depicted example, three grating couplers 604, 606, 608 uniformly spaced in a linear arrangement, with waveguides 610, 612 connecting neighboring pairs of waveguides, and a third waveguide 614 (which may be omitted in some embodiments) connecting the outer grating couplers 604, 608 of the linear arrangement directly to each other to form a closed loop. Light input to any one of the grating couplers will propagate to the other two grating couplers. The pair of adjacent grating couplers 604, 606, along with the waveguide 610 connecting them, forms one loopback alignment feature 616, and the pair of adjacent grating couplers 606, 608, along with the waveguide 612 connecting them, forms another loopback alignment feature 618. The two loopback alignment features 616, 618 share a common width (that is, distance between the respective pair of grating couplers), which may, by design, be equal to the distance x between the input/output couplers 102, 104 of the PIC on the photonic chip 600.

Figure 7A:
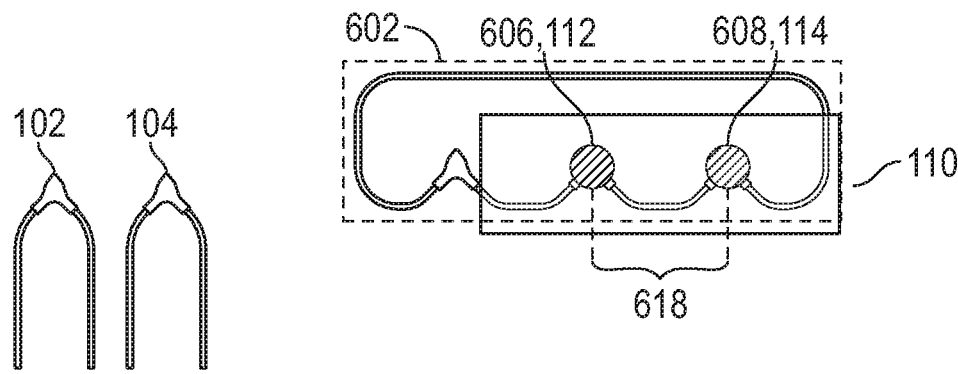
FIGS. 7A-7C are schematic top views of the photonic chip of FIG. 6 overlaid with an optical connector in various positions, illustrating the steps of aligning the optical connector with the pair of grating couplers in accordance with various embodiments.
Figure 7B:
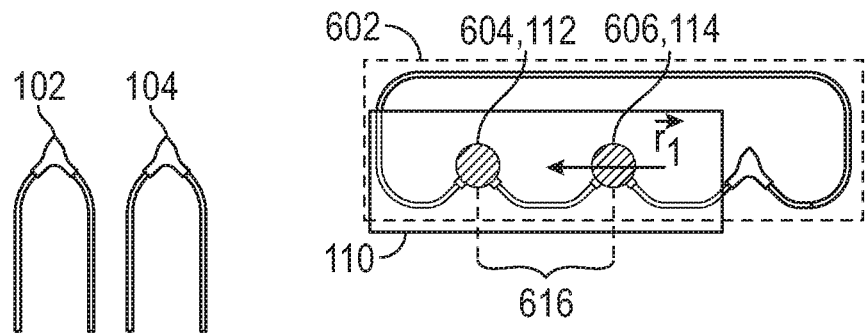
Figure 7C:
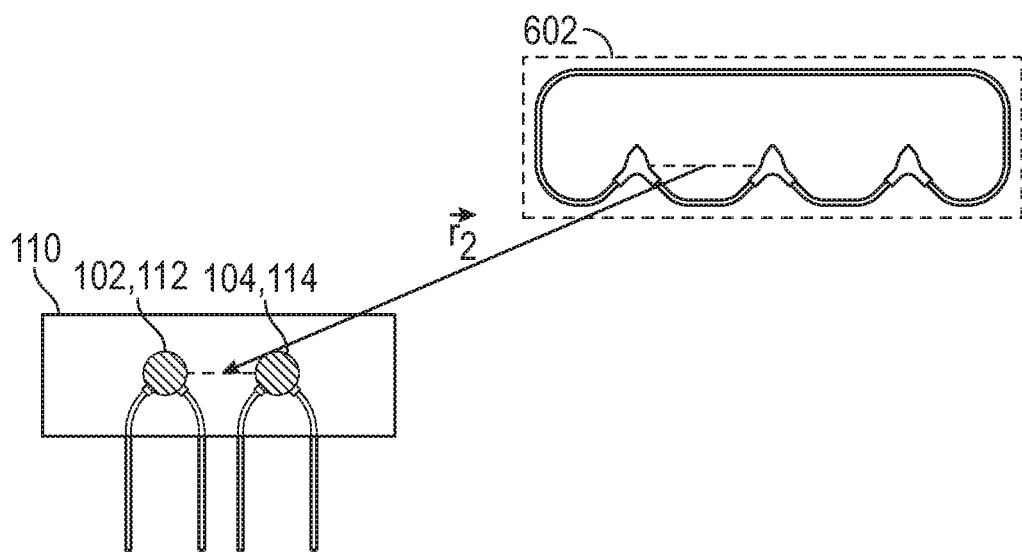

FIGS. 7A-7C are schematic top views of the photonic chip 600 of FIG. 6 overlaid with an optical connector 110 in various positions, illustrating the steps of aligning the optical connector 110 using the loopback structure 602. As can be seen, alignment based on two loopback alignment features of a single loopback structure is achieved in the same general manner as alignment based on two separate alignment features (as shown in FIGS. 5A-5C). In FIG. 7A, the optical connector 110 is shown in alignment with the first loopback alignment feature 618 formed by the middle grating coupler 606 and its neighbor to the right, grating coupler 608. To move the optical connector 110 into alignment with the second loopback alignment feature 616 as shown in FIG. 7B, the optical connector 110 is simply shifted to the left (along the line connecting the three grating couplers 604, 606, 608) by the width x of a pair of adjacent couplers, corresponding to a vector $\vec{r}_1$. These two alignment steps achieve calibrating the coordinate system associated with the photonic-chip layout and locating the optical connector 110 within that coordinate system. The optical connector 110 can then be brought into alignment with the input/output couplers 102, 104 of the PIC by moving it by the vector $\vec{r}_2$ from the second loopback alignment feature 616 to the pair of input/output couplers 102, 104.

The above-described examples all illustrate the alignment of two communication channels 112, 114 of an optical connector 110 to a single pair of input/output couplers of a PIC. The process can be straightforwardly generalized, however, to the alignment of an optical connector with two or more communication channels to two or more respective input/output couplers, which may be arranged in a one- or two-dimensional array. The input/output couplers of the PIC may include any combination of one or more input couplers operating to receive optical signals and/or one or more output couplers operating to transmit optical signals, that is, they may be all input couplers, all output couplers, or a combination of both.

Figure 8:
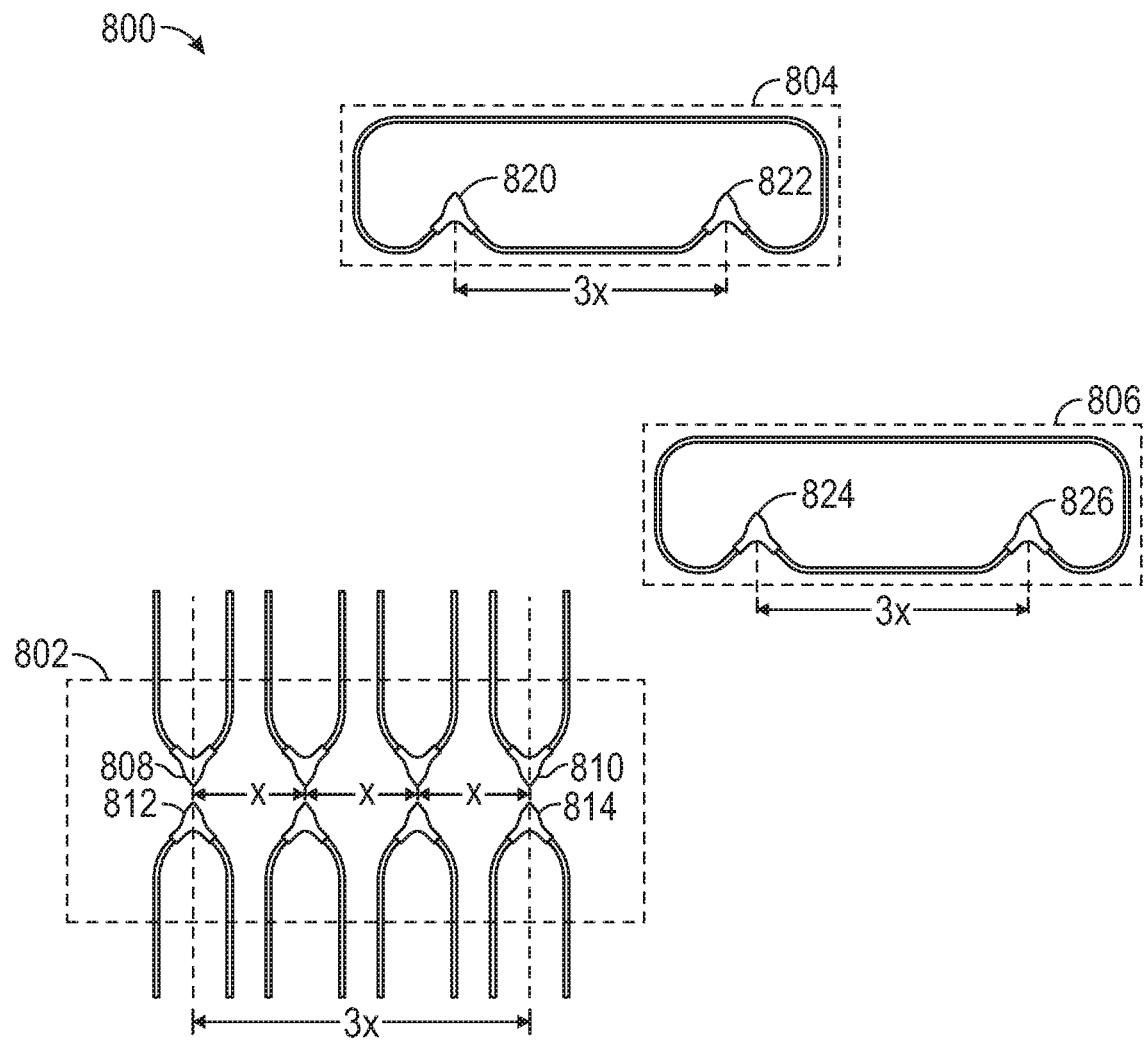
FIG. 8 is a schematic top view of a photonic chip including an array of four grating couplers of a PIC and two associated loopback alignment features, in accordance with various embodiments.

FIG. 8 is a schematic top view of an example photonic chip 800 including an array 802 of eight grating couplers of a PIC and two associated loopback alignment features 804, 806, in accordance with various embodiments. The array 802 of grating couplers includes two parallel, horizontally aligned rows of four grating couplers each. Within each row, the grating couplers are uniformly spaced, and the spacing is the same for both rows. In other words, the gratings are arranged in the array with a constant pitch. Denoting the pitch, that is, the distance between any two adjacent grating couplers within a row, by x, the outer grating couplers 808, 810 and 812, 814 in the two rows have a distance of 3x. The loopback alignment features 804, 806 each include two grating couplers (820, 822 and 824, 826) connected via two waveguides into a closed loop. The distance between the two grating couplers within each of the alignment features 804, 806 is, in the depicted example, equal to 3x, such that, for the active alignment of an optical connector to the loopback alignment feature 804, 806, a pair of communication channels configured to mate with the outer grating couplers 808, 810 or 812, 814 of the PIC is used.

Figure 9A:
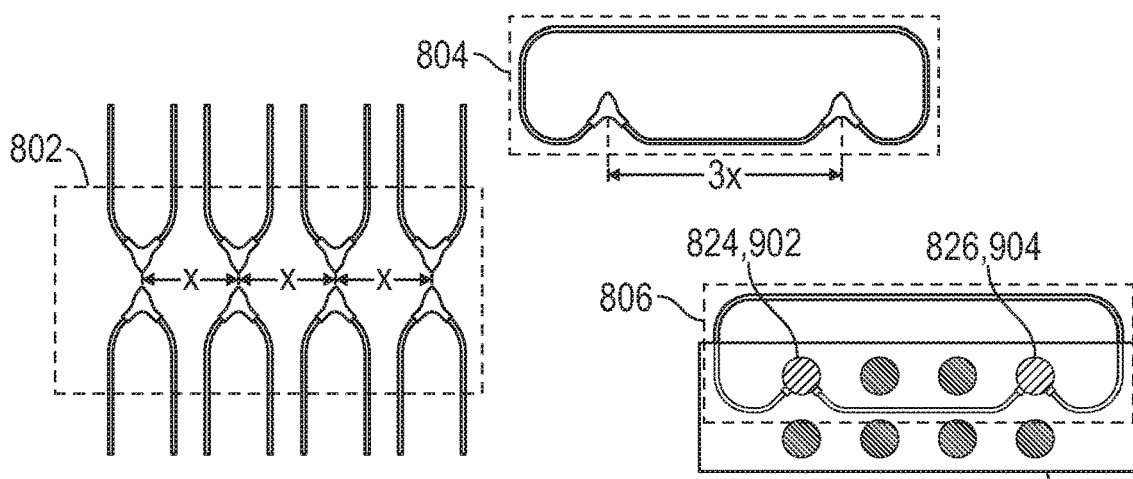
FIGS. 9A-9C are schematic top views of the photonic chip of FIG. 8 overlaid with an optical connector in various positions, illustrating the steps of aligning the optical connector with the array of grating couplers in accordance with various embodiments.
Figure 9B:
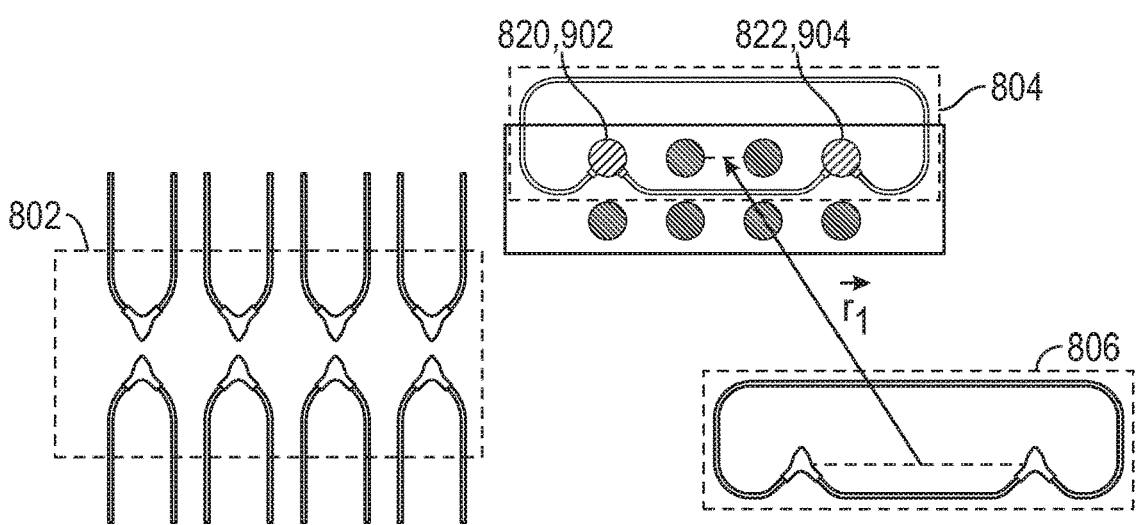
Figure 9C:
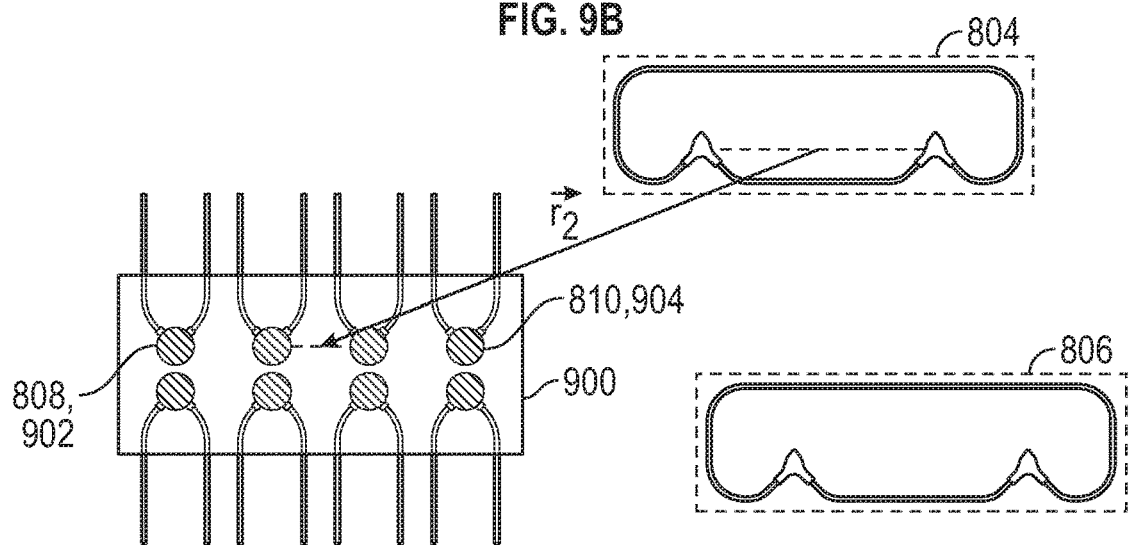

FIGS. 9A-9C illustrate the alignment process for an array 802 of grating couplers in schematic top views of the photonic chip 800 of FIG. 8 overlaid with an optical connector 900 in various positions. The optical connector 900 includes two rows of four communication channels each, spaced and arranged in the same manner as the input/output grating couplers of the array 802 on the photonic chip 800. Only a pair of outer communication channels 902, 904 of one of the rows is used for sequential alignment with the loopback alignment features 804, 806, as illustrated in FIGS. 9A and 9B, respectively. Based on the known relative positions between the two loopback alignment features 806, 804 (e.g., as reflected in a vector $\vec{r}_1$ connecting the midpoints between their respective pairs of gratings 824, 826 and 820, 822) and between at least one of the loopback alignment features 804, 806 and the array 800 of PIC grating couplers (e.g., as reflected in a vector $\vec{r}_2$ from the midpoint between gratings 820, 822 of loopback alignment feature 804 to the midpoint between the outer grating couplers 808, 810 of the array 800), the optical connector 900 can be aligned with the array 802 of grating couplers of the PIC. If the eight communication channels of the optical connector 900 are arranged precisely like the input/output grating couplers of the array 802 of the PIC, accurate alignment of the pair of outer communication channels 902, 904 with the pair of outer grating couplers 808, 810 inherently also ensures the proper alignment of all other communication channels to the respective grating couplers.

As will be readily appreciated by those of ordinary skill in the art given the benefit of the present disclosure, the distance between the two grating couplers within a loopback alignment feature need not necessarily match the width of a row within the array of input/output couplers of the PIC (which is, in the example of FIGS. 8-9C, 3x). For example, the loopback alignment feature may have grating couplers spaced at a distance x corresponding to the distance between two adjacent input/output couplers of the PIC, that is, to the pitch of the array of input/output couplers. In general, for any array of input/output couplers of a given pitch, the distance between the two grating couplers of the loopback alignment feature may be any integer multiple of that constant pitch, up to a maximum value corresponding to the width of the array. Even more generally, the positions of the couplers of the loopback alignment feature relative to each other can match the relative mutual positions of any two input/output couplers of the PIC (even two couplers of different rows). Further, as with the alignment of an optical connector with two communication channels to a single pair of input/output couplers of the PIC, the alignment of larger arrays of communication channels to corresponding arrays of input/output couplers may also utilize loopback alignment features provided in a single structure rather than by two separate structures.

Furthermore, while FIGS. 1A-9C all illustrate the alignment to grating couplers, the described alignment processes, structures, and configurations can readily be applied to other types of couplers, such as, for example, turning mirrors. In practice, the same type of coupler will usually be employed for all input/output couplers of the PIC as well as the couplers of the loopback alignment feature(s). In principle, however, it is also possible to use different types of couplers for the loopback alignment feature(s) than are used in the PIC, and/or even to mix coupler types within the PIC or within a loopback alignment feature.

The principles discussed above are, moreover, not limited to surface coupling, but can be applied to edge coupling as well. To illustrate, FIG. 10 shows, in a perspective view, a photonic chip 1000 including, in the plane of the top surface 1002 of the photonic chip 1000, two waveguides 1004, 1006 terminating at a side face 1008 of the chip 1000. These waveguides 1004, 1006 serve as waveguide edge couplers to an optical connector 110 oriented with its communication channels 112, 114 in the plane of the PIC. FIG. 10 shows the optical connector 110 in alignment (albeit not yet coupled) with the coupling points 1016, 1018 provided by the waveguide edge couplers 1004, 1006 in the side face 1008.

FIG. 11 illustrates a variant of such edge-coupling structures, showing a photonic chip 1100 that includes six waveguides 1102 embedded in two layers of the photonic chip 1100 parallel to the top surface 1104 (with three waveguides 1102 in each of the two layers). At the side face 1106, the six waveguides 1102 form a two-by-three array of coupling points 1108. An optical connector 1110 with a corresponding array of six communication channels 1112 is shown in alignment with the coupling points 1108.

Figure 13A:
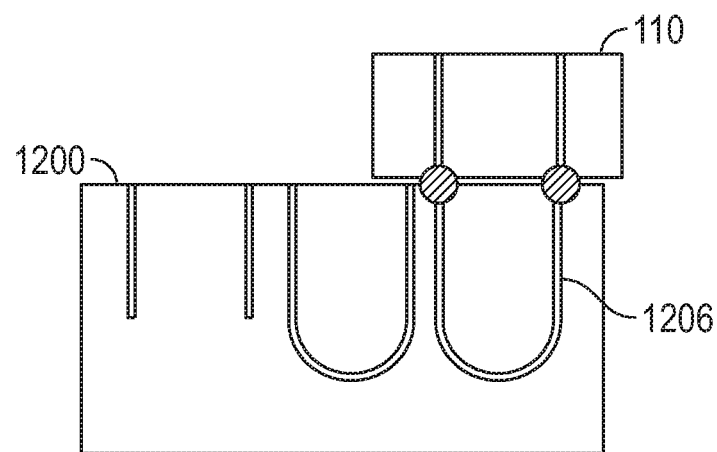
FIGS. 13A-13C are schematic top views of the photonic chip of FIG. 12 and an optical connector in various positions, illustrating the steps of aligning the optical connector the waveguide edge couplers in accordance with various embodiments.
Figure 13B:
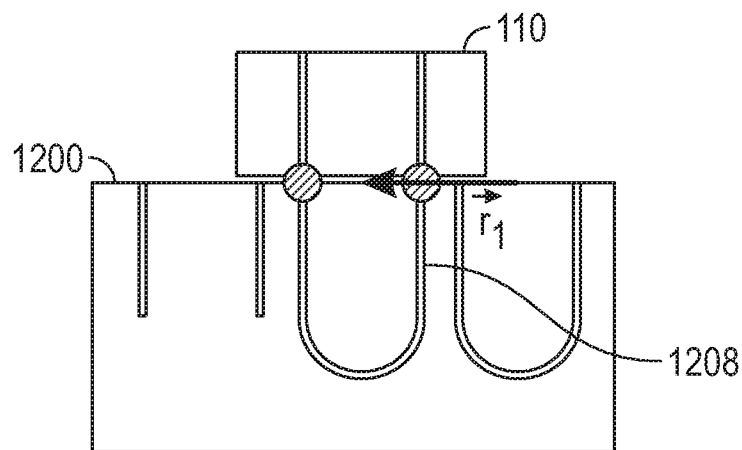
Figure 13C:
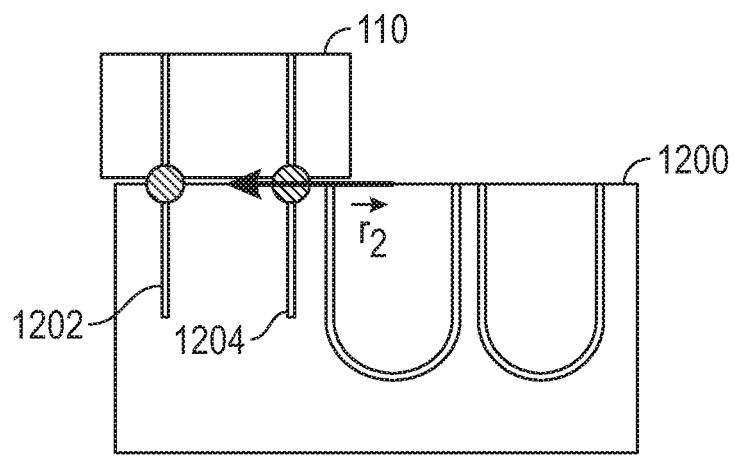

The use of loopback alignment features for the alignment of an optical connector to waveguide edge couplers is illustrated in FIGS. 12-13C for the example of a single pair of waveguide edge couplers. FIG. 12 provides a schematic top view of a photonic chip 1200 including a pair of waveguide edge couplers 1202, 1204 of a PIC and two associated loopback alignment features 1206, 1208, in accordance with various embodiments. Each of the loopback alignment features 1206, 1208 forms a U-turn waveguide terminating, at both ends, at the same side face 1210 of the photonic chip 1200 as the waveguide edge couplers 1202, 1204. The distance, in each loopback alignment feature 1206 or 1208, between its two coupling points 1212, 1214 or 1216, 1218 is equal to the distance x between the coupling points 1220, 1222 of the pair of waveguide edge couplers 1202, 1204. The relative positions of the waveguide edge couplers 1202, 1204 and the loopback alignment features 1206, 1208 are known.

FIGS. 13A-13C are schematic top views of the photonic chip 1200 of FIG. 12 and an optical connector 110 with two communication channels 112, 114 successively aligned with the first loopback alignment feature 1206, the second loopback alignment feature 1208, and the waveguide edge couplers 1202, 1204 of the PIC. Just as with the alignment process for grating couplers, the vector $\vec{r}_1$ by which the optical connector 110 is moved from alignment with the first U-turn waveguide loopback alignment feature 1206 into alignment with the second U-turn waveguide alignment feature 1208 serves to calibrate the coordinate system in which the waveguide edge couplers 1202, 1204 and loopback alignment features 1206, 1208 are defined. Based on the known vector $\vec{r}_2$ between the midpoint between coupling points 1216, 1218 of the second loopback alignment feature 1208 and the midpoint between coupling points 1220, 1222 of the waveguide edge couplers 1202, 1204, the optical connector 110 can then be moved into its final position, where the optical communication channels 112, 114 are connected to the coupling points 1220, 1222 of the waveguide edge couplers 1202, 1204.

In the embodiments of the above-described figures, the loopback alignment feature(s) are oriented parallel to a pair (or a row in an array) of input/output couplers of the respective PICs, such that the optical connector, following alignment with the loopback alignment feature(s), can simply be translated in one or two dimensions into a position aligned with the PIC input/output couplers. In general, however, the loopback alignment feature(s) may be rotated relative to the PIC input/output couplers about an axis normal to the plane in which the input/output couplers and loopback alignment feature(s) are defined (e.g., the top surface of the photonic chip in surface-coupling embodiments and the side face in edge-coupling embodiments). In other words, the line connecting the input/output couplers of the PIC to which the optical connector is to be coupled may generally enclose any zero or non-zero angle with the line connecting the coupling points of a loopback-alignment feature. In accordance herewith, this angle is known by design. For non-zero angles, movement of the optical connector from a position aligned with the loopback alignment feature to a position aligned with the PIC input/output couplers requires a third, rotational degree of freedom in addition to the generally two translational degrees of freedom.

Figure 14:
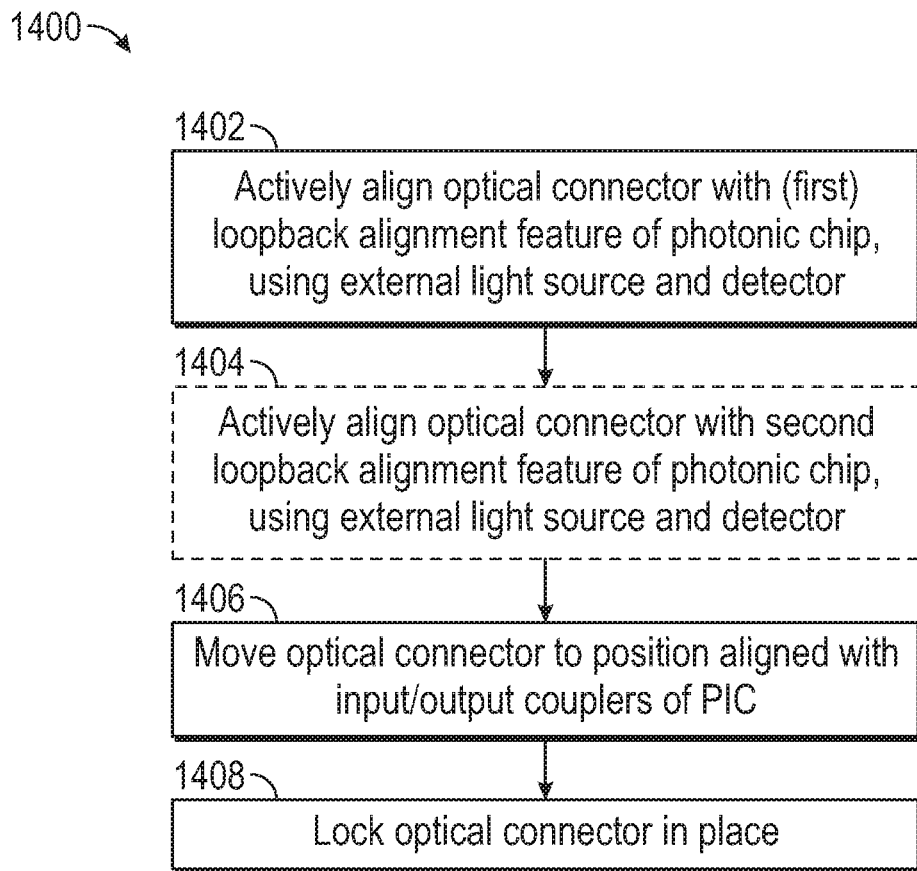
FIG. 14 is a flow chart illustrating methods of aligning an optical connector to input/output couplers of a PIC using loopback alignment features, in accordance with various embodiments.

FIG. 14 summarizes, in the form of a flow chart, methods 1400 of aligning an optical connector to input/output couplers of a PIC in accordance with various embodiments. The methods 1400 begin with the active alignment of the optical connector with a loopback alignment feature formed in the substrate of the photonic chip (act 1402). This active alignment is performed using a light source and detector external to the photonic chip. Light from the light source is coupled into a first communication channel of the optical connector, and the detector is placed to measure light received through a second communication channel. The first and second communication channels are initially roughly aligned with, and thereby optically coupled to, two coupling points of the loopback alignment feature to provide an optical path from the light source to the detector. The alignment is then fine-tuned to optimize the optical coupling and thereby maximize the intensity of the light measured by the detector. In some embodiments, the optical connector is moved to, and the active alignment process is repeated for, a second loopback alignment feature (act 1404). Following the active alignment to the loopback alignment feature(s), the optical connector is moved (more specifically, translated in one or two dimensions and, if applicable, rotated) to a position aligned with the input/output couplers of the PIC (act 1406). In that position, the optical connector is locked in place in any of a number of ways known to those of ordinary skill in the art, e.g., by gluing with epoxy, soldering, or laser welding the optical connector the to the input/output couplers (act 1408). The methods 1400 may be employed in a manufacturing line to serially align optical connectors to multiple respective PICs. Since active alignment is, in accordance with the methods 1400, limited to alignment features unconnected to the PIC, obviating the need to power up the PIC, the throughput can be substantially increased, as compared with methods for actively aligning optical connecters directly to the input/output couplers of the PIC.

Figure 15:
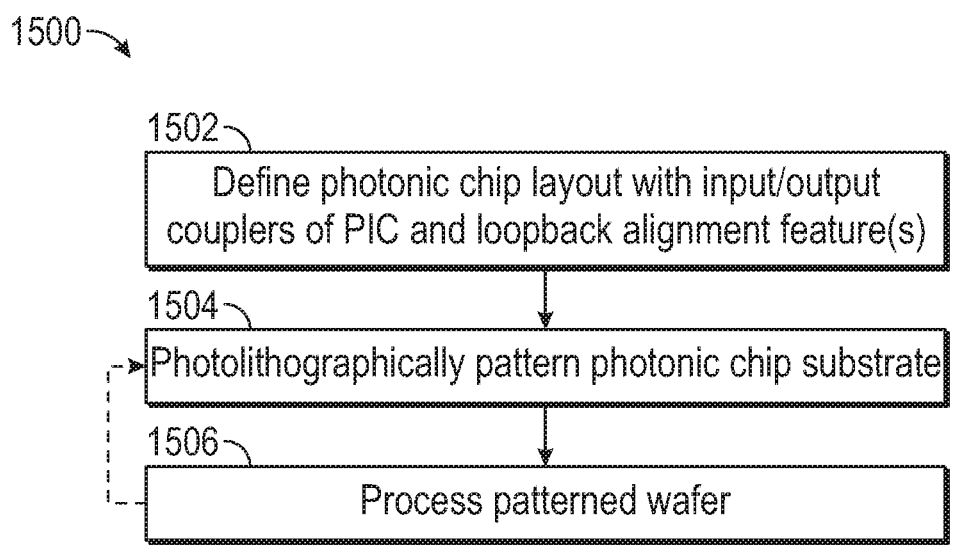
FIG. 15 is a flow chart illustrating an example method of manufacturing a photonic chip with input/output couplers of a PIC and associated loopback alignment features in accordance with various embodiments.

FIG. 15 illustrates a method 1500 for manufacturing a photonic chip with loopback alignment features as described herein. The method involves creating a layout for the photonic chip that jointly defines the PIC and loopback alignment feature(s) (act 1502). The photonic chip is photolithographically patterned in accordance with this layout (act 1504), and the patterned chip is processed, e.g., using wet etching or dry etching as known to those of ordinary skill in the art, to create the photolithographically defined features (act 1506). In some embodiments, patterning and processing steps, and/or the intermittent deposition of additional layers, are iterated to form more complex layered structures. The input/output couplers of the PIC and the loopback alignment features are, in various embodiments, patterned on the chip in a single photolithographic step using a single photomask, which ensures their accurate relative positioning. Even if the PIC input/output couplers and the loopback alignment features are created with different photomasks, however, alignment accuracies of these masks relative to the chip, and the resulting positional accuracies of the patterned PIC input/output couplers and loopback alignment feature(s), are generally better than 300 nm, enabling the optical-connector alignment accuracies desired for single-mode coupling.

The input/output couplers of the PIC and the couplers of the loopback alignment features may all be formed by silicon grating couplers, or they may all be formed by silicon-nitride-(SiN)-based or indium-phosphide-(InP)-based grating couplers. Alternatively, the input/output couplers of the PIC may be formed of SiN while the couplers of the loopback alignment features may be formed of silicon or InP, or vice versa. Similarly, edge-coupling PICs may have the input/output couplers and the couplers of the loopback alignment features all formed by SiN waveguides and facets, or all formed by silicon waveguides and facets or InP waveguides and facets. Alternatively, the input/output couplers may be formed by SiN waveguides and facets while the couplers of the loopback alignment features may be formed by silicon or InP waveguides and facets, or vice versa. In any of these examples, the PIC and loopback alignment features may be formed on silicon substrates with buried oxide, or on InP substrates, as non-limiting examples.

Having described different aspects and features of loopback alignment features and associated alignment and manufacturing methods, the following numbered examples are provided as illustrative embodiments.

1. A method comprising: actively aligning an optical connector with a first loopback alignment feature formed in a substrate of a photonic chip by coupling light from a light source external to the photonic chip via a first channel of the optical connector into the first loopback alignment feature and measuring light received from the first loopback alignment feature via a second channel of the optical connector with a detector external to the photonic chip, the first loopback alignment feature being optically unconnected to a photonic integrated circuit (PIC) formed in the substrate of the photonic chip; actively aligning the optical connector with a second loopback alignment feature formed, unconnected to the PIC, in the substrate of the photonic chip by coupling light from the light source via the first channel of the optical connector into the second loopback alignment feature and measuring light received from the second loopback alignment feature via the second channel of the optical connector with the detector; following active alignment of the optical connector with the first and second loopback alignment features, moving the optical connector, based on known positions of the first and second loopback alignment features relative to input/output couplers of the PIC, to a position aligned with the input/output couplers of the PIC; and locking the optical connector in place in the position aligned with the input/output couplers of the PIC.

2. The method of example 1, wherein the first loopback alignment feature and the second loopback alignment feature form separate, optically unconnected structures.

3. The method of example 1, wherein the first loopback alignment feature and the second loopback alignment feature form a single structure.

4. The method of example 3, wherein the single structure comprises three grating couplers optically connected to each other, a distance between a first one of the three grating couplers and a second one of the three grating couplers being equal to a distance between the second one of the three grating couplers and a third one of the three grating couplers.

5. The method of any one of examples 1-4, wherein aligning the first loopback alignment feature comprises aligning the first and second channels of the optical connector with respective first and second couplers of the first loopback alignment feature, a distance between the first and second couplers being equal to a distance between two of the input/output couplers of the PIC.

6. The method of any one of examples 1-5, wherein the input/output couplers of the PIC comprise at least one of grating couplers or turning mirrors.

7. The method of example 6, wherein the first loopback alignment feature comprises two couplers optically connected to each other, the two couplers comprising grating couplers or turning mirrors.

8. The method of example 6, wherein the first loopback alignment feature comprises two grating couplers optically connected to each other to form a closed loop.

9. The method of any one of examples 1-5, wherein the input/output couplers of the PIC comprise waveguide edge couplers.

10. The method of example 9, wherein the first loopback alignment feature comprises a waveguide U-turn terminating at a same surface of the PIC as the waveguide edge couplers.

11. The method of any one of examples 1-9, wherein the channels of the optical connector are input/output couplers of a second photonic integrated circuit (PIC) formed in a second photonic chip.

12. The method of any one of examples 1-11, wherein the active alignment of the optical connector with the first and second loopback alignment features is performed without supplying electrical power to the PIC.

13. A photonic chip comprising: a substrate; a photonic integrated circuit (PIC) comprising a plurality of photonic devices formed in the substrate, the plurality of photonic devices comprising a first plurality of input/output couplers arranged in an array having a constant pitch; and first and second loopback alignment features formed in the substrate, the first and second loopback alignment features being optically unconnected to the PIC and each comprising two couplers, a distance between the two couplers being equal to an integer multiple of the constant pitch of the array of input/output couplers of the PIC.

14. The photonic chip of example 13, wherein the first loopback alignment feature and the second loopback alignment feature form separate, optically unconnected structures.

15. The photonic chip of example 13, wherein the first loopback alignment feature and the second loopback alignment feature form portions of a single structure.

16. The photonic chip of any one of examples 13-15, wherein the input/output couplers of the PIC comprise two grating couplers and the first and second loopback alignment features each comprises two grating couplers optically connected to each other.

17. The photonic chip of any one of examples 13 and 14, wherein the input/output couplers of the PIC comprise waveguide edge couplers and the first and second loopback alignment features each comprise a waveguide U-turn terminating at a same surface of the PIC as the waveguide edge couplers.

18. A method of manufacturing a photonic chip comprising two loopback alignment features, the method comprising: photolithographically patterning a substrate to simultaneously define, with a single photomask, a plurality of input/output couplers of a photonic integrated circuit (PIC) and the two loopback alignment features, the plurality of input/output couplers being arranged in an array having a constant pitch, the two loopback alignment features being optically unconnected to the PIC and positioned at specified locations relative to a plurality of input/output couplers, each of the two loopback alignment features comprising two couplers, a distance between the two couplers being equal to an integer multiple of the constant pitch of the array of input/output couplers; and processing the patterned substrate to create the photonic integrated circuit and the two loopback alignment features in the substrate.

19. The method of claim 18, wherein the two loopback alignment features comprise grating couplers.

20. The method of claim 18, wherein the two loopback alignment features form a single structure.

Although the inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. A photonic chip comprising:
   a substrate;
   a photonic integrated circuit (PIC) comprising a plurality of photonic devices formed in the substrate, the plurality of photonic devices comprising a first plurality of input/output couplers arranged in an array having a constant pitch; and
   at least one loopback alignment feature formed in the substrate optically unconnected to the PIC, the at least one loopback alignment feature comprising a closed loop formed by at least two couplers and at least two waveguides connecting the at least two couplers, a distance between the at least two couplers being equal to an integer multiple of the constant pitch of the array of input/output couplers of the PIC.

2. The photonic chip of claim 1, wherein the at least one loopback alignment feature comprises a first loopback alignment feature comprising the closed loop and a second loopback alignment feature, optically unconnected to the first loopback alignment feature, comprising two additional couplers connected to each other by at least one waveguide, a distance between the two additional couplers being equal to an integer multiple of the constant pitch of the array of input/output couplers of the PIC.

3. The photonic chip of claim 1, wherein the closed loop is formed by at least three couplers and at least three optical waveguides connecting the at least three couplers, and wherein the at least one loopback alignment feature comprises two loopback alignment features comprising two respective pairs of couplers among the at least three couplers.

4. The photonic chip of claim 1, wherein the at least three couplers are uniformly spaced in a linear arrangement.

5. The photonic chip of claim 1, wherein the at least two couplers of the at least one loopback alignment feature comprise grating couplers.

6. The photonic chip of claim 1, wherein the at least two couplers of the at least one loopback alignment feature comprise turning mirrors.

7. A method for aligning an optical connector with input/output couplers of a photonic integrated circuit (PIC) formed in a photonic chip, the method comprising:
actively aligning the optical connector with a loopback alignment feature formed in the photonic chip optically unconnected to the PIC by coupling light from a light source external to the photonic chip via a first channel of the optical connector into a first coupler of the loopback alignment feature and measuring the light at a second coupler of the loopback alignment feature via a second channel of the optical connector with a detector external to the photonic chip, the light transmitted from the first coupler to the second coupler via two separate optical connections each comprising a waveguide;
after active alignment of the optical connector with the loopback alignment feature, moving the optical connector, based at least in part on a known positions of the loopback alignment feature relative to the input/output couplers of the PIC, to a position aligned with the input/output couplers of the PIC; and
locking the optical connector in place in the position aligned with the input/output couplers of the PIC.

8. The method of claim 7, further comprising actively aligning the optical connector with an additional loopback alignment feature formed in the photonic chip optically unconnected to the PIC, and calibrating a coordinate system in which the PIC and the loopback alignment features are defined relative to a movement of the optical connector based on a known relative position between the loopback alignment features.

9. The method of claim 8, wherein the loopback alignment feature and the additional loopback alignment feature form a single closed loop comprising the first coupler, the second coupler, and a third coupler in a linear arrangement.

10. The method of claim 8, wherein the loopback alignment feature and the additional loopback alignment feature form separate, optically unconnected structures.

11. The method of claim 7, wherein the optical connector is aligned with the input/output couplers of the PIC without supplying electrical power to the PIC.

12. The method of claim 7, wherein the optical connector is aligned with the input/output couplers of the PIC without establishing electrical connections between an alignment system and the PIC.

13. The method of claim 7, wherein the optical connector is moved into the position aligned with the input/output couplers of the PIC using a robot with high-accuracy translational and rotational stages.

14. The method of claim 7, wherein the optical connector is aligned to the input/output couplers of the PIC at a temperature selected based on an intended range of operating temperatures of the PIC.

15. A method of manufacturing a photonic chip comprising at least one loopback alignment feature, the method comprising:
photolithographically patterning a substrate to simultaneously define, with a single photomask, a plurality of input/output couplers of a photonic integrated circuit (PIC) and the at least one loopback alignment feature, the plurality of input/output couplers being arranged in an array having a constant pitch, and the at least one loopback alignment feature comprising a closed loop formed by at least two couplers and at least two waveguides connecting the at least two couplers, a distance between the at least two couplers being equal to an integer multiple of the constant pitch of the array of input/output couplers of the PIC; and
processing the patterned substrate to create the photonic integrated circuit and the at least one loopback alignment feature in the substrate.

16. The method of claim 15, wherein the at least two couplers comprise grating couplers.

17. The method of claim 16, wherein the grating couplers comprise at least one of silicon-nitride-based or indium-phosphide-based grating couplers.

18. The method of claim 15, wherein the at least one loopback alignment feature comprises two loopback alignment features forming a single structure.

19. The method of claim 18, wherein the two loopback alignment features comprise at least three couplers uniformly spaced in a linear arrangement.

20. The method of claim 15, wherein the at least one loopback alignment feature comprises two loopback alignment features forming separate, optically unconnected structures.

* * * * *